(12) United States Patent
Takahashi et al.

(10) Patent No.: US 10,697,382 B2
(45) Date of Patent: Jun. 30, 2020

(54) CONTROL DEVICE FOR SUPERCHARGING SYSTEM

(71) Applicant: MITSUBISHI HEAVY INDUSTRIES ENGINE & TURBOCHARGER, LTD., Sagamihara-shi, Kanagawa (JP)

(72) Inventors: Tomohiro Takahashi, Tokyo (JP); Takashi Ikeda, Tokyo (JP); Kiyoshi Terakado, Tokyo (JP); Naoyuki Mori, Tokyo (JP); Vissuta Jiwariyavej, Tokyo (JP)

(73) Assignee: MITSUBISHI HEAVY INDUSTRIES ENGINE & TURBOCHARGER, LTD., Sagamihara-Shi (JP)

( * ) Notice: Subject to any disclaimer, the term of this patent is extended or adjusted under 35 U.S.C. 154(b) by 385 days.

(21) Appl. No.: 15/578,470

(22) PCT Filed: Nov. 20, 2015

(86) PCT No.: PCT/JP2015/082640
§ 371 (c)(1),
(2) Date: Nov. 30, 2017

(87) PCT Pub. No.: WO2017/085854
PCT Pub. Date: May 26, 2017

(65) Prior Publication Data
US 2018/0156141 A1 Jun. 7, 2018

(51) Int. Cl.
*F02D 41/00* (2006.01)
*F02D 23/02* (2006.01)
(Continued)

(52) U.S. Cl.
CPC .......... *F02D 41/0007* (2013.01); *F02B 37/18* (2013.01); *F02B 37/22* (2013.01);
(Continued)

(58) Field of Classification Search
CPC ...... F02D 41/0007; F02D 23/02; F02D 23/00; F02D 45/00; F02D 41/1406;
(Continued)

(56) References Cited

U.S. PATENT DOCUMENTS 6,401,457 B1 * 6/2002 Wang ...................... F02B 37/18
123/568.21
6,647,723 B1 * 11/2003 Sun .......................... F01L 1/34
60/601

(Continued)

FOREIGN PATENT DOCUMENTS

EP 1 323 907 A1 7/2003
EP 2 615 274 A1 7/2013
(Continued)

OTHER PUBLICATIONS

Office Action dated Jun. 8, 2018, issued to the corresponding JP Application No. 2017-551483 wth an English Translation.
(Continued)

*Primary Examiner* — Laert Dounis
*Assistant Examiner* — Edward Bushard
(74) *Attorney, Agent, or Firm* — Birch, Stewart, Kolasch & Birch, LLP

(57) ABSTRACT

A control apparatus of a supercharging system for supplying an engine with compressed intake air, includes: a supercharger including a compressor configured to compress the intake air to be supplied to the engine; and a controller for controlling a control device affecting operation of the compressor. The controller includes: a compressor map storage part configured to store a compressor map which indicates a relationship of an intake volume flow rate, a pressure ratio, and a compressor rotation speed in the compressor; a current position calculation part configured to calculate a current position of an operational point of the compressor on the
(Continued)

compressor map every predetermined period; a moving direction calculation part configured to calculate a moving direction of the operational point on the compressor map on the basis of the current position of the operational point calculated by the current position calculation part; and a control part configured to control the control device on the basis of the current position of the operational point calculated by the current position calculation part and the moving direction of the operational point calculated by the moving direction calculation part.

9 Claims, 9 Drawing Sheets

(51) Int. Cl.
| | |
|---|---|
| F02D 23/00 | (2006.01) |
| F02D 45/00 | (2006.01) |
| F02D 41/14 | (2006.01) |
| F02B 37/24 | (2006.01) |
| F02B 37/18 | (2006.01) |
| F02B 37/22 | (2006.01) |
| F02B 37/12 | (2006.01) |
| F02D 41/30 | (2006.01) |

(52) U.S. Cl.
CPC ............ *F02B 37/24* (2013.01); *F02D 23/00* (2013.01); *F02D 23/02* (2013.01); *F02D 41/1406* (2013.01); *F02D 45/00* (2013.01); F02B 2037/122 (2013.01); F02B 2037/125 (2013.01); *F02D 41/3005* (2013.01); *Y02T 10/144* (2013.01)

(58) Field of Classification Search
CPC ...... F02D 41/3005; F02B 37/24; F02B 37/18; F02B 37/22; F02B 2037/125; F02B 2037/122; Y02T 10/144
See application file for complete search history.

(56) References Cited

U.S. PATENT DOCUMENTS

| | | | |
|---|---|---|---|
| 7,076,954 B1* | 7/2006 | Sopko, Jr. | ............ B60K 6/46 60/607 |
| 8,280,570 B2 | 10/2012 | Masuda | |
| 9,273,597 B2* | 3/2016 | Kokotovic | ............ F02B 37/186 |
| 2009/0007564 A1 | 1/2009 | Suzuki et al. | |
| 2009/0198432 A1 | 8/2009 | Tabata et al. | |
| 2009/0211248 A1 | 8/2009 | Andreae et al. | |
| 2011/0041493 A1 | 2/2011 | Doering et al. | |
| 2015/0225927 A1 | 8/2015 | Hoshino et al. | |
| 2016/0265468 A1 | 9/2016 | Takayanagi et al. | |

FOREIGN PATENT DOCUMENTS

| | | |
|---|---|---|
| JP | 2005-240683 A | 9/2005 |
| JP | 2007-255265 A | 10/2007 |
| JP | 2007-291961 A | 11/2007 |
| JP | 2008-8241 A | 1/2008 |
| JP | 2008-45411 A | 2/2008 |
| JP | 2009-7934 A | 1/2009 |
| JP | 2009-56909 A | 3/2009 |
| JP | 2009-167963 A | 7/2009 |
| JP | 2010-179861 A | 8/2010 |
| JP | 2011-126321 A | 6/2011 |
| JP | 5195142 B2 | 5/2013 |
| JP | 2014-9525 A | 1/2014 |
| JP | 2015-182725 A | 10/2015 |
| WO | WO 2015/083611 A1 | 6/2015 |

OTHER PUBLICATIONS

Extended European Search Report dated Aug. 9, 2018 issued to the corresponding EP Application No. 15908794.9.
International Search Report of PCT/JP2015/082640 dated Dec. 28, 2015.
Written Opinion of the International Searching Authority of PCT/JP2015/082640 dated Dec. 28, 2015 with an English Translation.
Office Action dated Mar. 20, 2020 issued in counterpart Chinese Application No. 201580078777.2 with an English Translation.

* cited by examiner

CONTROL DEVICE FOR SUPERCHARGING SYSTEM

TECHNICAL FIELD

The present disclosure relates to a control device for a supercharging system for supplying an engine with compressed intake air.

BACKGROUND ART

As a technique to improve an output of an engine, a method (supercharging) of compressing intake air with a supercharger and supplying an engine with the compressed intake air is known, and widely used in various engines. When the operational state of an engine changes suddenly, for instance, a supercharger may transiently enter an abnormal operation state called surging. When a supercharger enters a surging state, it is no longer possible to compress intake air. Further, if a supercharger enters a surging state often, it may lead to breakage of the devices. Thus, a supercharger needs to be controlled appropriately so as to avoid entering a surging state as much as possible.

Typically, as a technique to control a supercharger, a feedback control is performed on a supercharger so that an operational point on a compressor map does not enter a surge region, on the basis of information obtained by sensing the intake flow rate and the rotation speed, for instance. In other words, a supercharger is feedback-controlled on the basis of the current position of an operational point on a compressor map. For instance, Patent Document 1 discloses performing a feedback control on the turbo rotation speed so that the actual turbo rotation speed detected by a turbo rotation speed sensor matches a target turbo rotation speed corresponding to the current operation state, thereby preventing the operational point of a turbocharger on the compressor map from entering the surge region.

CITATION LIST

Patent Literature

Patent Document 1: JP2007-291961A

SUMMARY

Problems to be Solved

However, a feedback control is performed after obtaining information from a sensor. Thus, the operational point of the supercharger may cross the surge line due to failure to control the supercharger on time, and the supercharger may enter a surging state temporarily. In particular, if an engine is at a high altitude, the atmospheric density is small as compared to a case in which an engine is at a low altitude, and thus the pressure ratio (outlet pressure/inlet pressure of a supercharger) increases, and the risk of entering the surging state becomes even higher.

If a control target is lowered to avoid entrance into the surging state to avoid the above the case, the performance of the supercharger also deteriorates. Increasing the size of a supercharger to make up for the performance deterioration may lead to a cost increase.

Furthermore, if the control is performed only on the basis of the current position of the operational point on the compressor map, it is not possible to determine in which direction the operational point is moving on the compressor map. Thus, it is difficult to control the supercharger efficiently when the supercharger is to be controlled so as to move the operational point on the compressor map to a target position.

The present invention was made in view of the above, and an object of the present invention is to provide a control apparatus for a supercharging system capable of moving the operational point of the supercharger to a desired position on a compressor map efficiently.

Solution to the Problems (1) A control apparatus of a supercharging system for supplying an engine with compressed intake air, according to at least one embodiment of the present invention, comprises: a supercharger including a compressor configured to compress the intake air to be supplied to the engine; and a controller for controlling a control device affecting operation of the compressor. The controller includes: a compressor map storage part configured to store a compressor map which indicates a relationship of an intake volume flow rate, a pressure ratio, and a compressor rotation speed in the compressor; a current position calculation part configured to calculate a current position of an operational point of the compressor on the compressor map every predetermined period; a moving direction calculation part configured to calculate a moving direction of the operational point on the compressor map on the basis of the current position of the operational point calculated by the current position calculation part; and a control part configured to control the control device on the basis of the current position of the operational point calculated by the current position calculation part and the moving direction of the operational point calculated by the moving direction calculation part.

Superchargers includes, for example, a turbocharger described below which rotates a compressor with a turbine rotated by exhaust gas discharged from an engine, an electric supercharger which rotates a compressor with kinetic energy from an electric motor, and a mechanical supercharger which rotates a compressor with kinetic energy from a crank shaft of an engine.

With the above embodiment (1), operation of the compressor is controlled on the basis of both of the current position of the operational point and the moving direction of the operational point on the compressor map. Thus, compared to a typical case in which operation of the compressor is controlled on the basis of only the current position of the operational point on the compressor map, it is possible to use the moving direction of the operational point to control the compressor, and thereby it is possible to move the operational point of the compressor to a desired position on the compressor map efficiently.

(2) In some embodiments, in the above control apparatus of a supercharging system described in the above (1), the controller further includes a moving direction determination part configured to determine whether the moving direction of the operational point is in a target direction. The control part is configured to control the control device so as to orient the moving direction of the operational point in the target direction, if the moving direction of the operational point is not in the target direction.

According to the above embodiment (2), the control devices are controlled automatically by the control part so that the moving direction of the operational point turns in the target direction. Thus, it is possible to move the operational point of the compressor efficiently to a desired position on the compressor map.

(3) In some embodiments, in the control apparatus of a supercharging system described in the above (2), the controller further includes a control map storage part configured to storage a control map for calculating a control amount of the control device corresponding to the current position of the operational point. The control part is configured to correct the control amount of the control device calculated on the basis of the control map, so as to orient the moving direction of the operational point in the target direction.

According to the above embodiment (3), the control device is controlled so that the moving direction of the operational point turns in the target direction, by correcting the control amount of the control device calculated on the basis of the control map. The control map is, for instance, a map for calculating the control amount of the control devices and the like during normal operation of the engine. Accordingly, it is possible to control the compressor so that the moving direction of the operational point turns in the target direction, with a simple configuration of correcting the control amount calculated by the control map.

(4) In some embodiments, in the control apparatus of a supercharging system according to any one of (1) to (3), the controller further includes a moving velocity calculation part configured to calculate a moving velocity of the operational point on the basis of a change amount per time of the current position of the operational point calculated by the current position calculation part. The control part is configured to control the control device on the basis of the current position of the operational point calculated by the current position calculation part, the moving direction of the operational point calculated by the moving direction calculation part, and the moving velocity of the operational point calculated by the moving velocity calculation part.

According to the above embodiment (4), the compressor is controlled on the basis of the moving velocity of the operational point on the compressor map, in addition to the current position of the operational point and the moving direction of the operational point on the compressor map. Accordingly, by using the moving velocity of the operational point to control the compressor, it is possible to reflect the concept of time in the control when moving the operational point of the compressor to a desired position on the compressor map.

(5) In some embodiments, in the control apparatus of a supercharging system described in (4), the controller further includes an arrival time estimation part configured to estimate an arrival time the operational point takes to arrive at a predetermined region or a target position from the current position, on the basis of the moving direction and the moving velocity of the operational point. The control part is configured to estimate an arrival time the operational point takes to arrive at a predetermined region or a target position from the current position, on the basis of the moving direction and the moving velocity of the operational point, and control the control device in response to a comparison result between a predetermined time and the arrival time estimated by the arrival time estimation part.

According to the above embodiment (5), the arrival time the operational point takes to arrive at a predetermined region or a target position from the current portion is estimated on the basis of the moving direction and the moving velocity of the operational point, and the control device is controlled in response to the comparison result between the estimated arrival time and the predetermined time. Thus, for instance, as described below, it is possible to control the compressor taking into account the time the operational point takes to enter the surge region from the current position and the time the operational point takes to arrive at a target position from the current position.

(6) In some embodiments, in the control apparatus of a supercharging system described in (5), the predetermined region is a surge region defined as a region where surging is likely to occur if the operational point is in the predetermined region. The control part is configured to control the control device so as to avoid entrance of the operational point into the surge region, if the arrival time the operational point takes to arrive at the surge region from the current position is shorter than a first predetermined time.

According to the above embodiment (6), the compressor is controlled so as to avoid entrance of the operational point into the surge region if the arrival time the operational point takes to arrive at the surge region over the surge line from the current position is shorter than the first predetermined time. The first predetermined time is a time necessary for the operational point at the current position to avoid entering the surge region (response delay time) when a normal feedback control is performed on the control device. Thus, according to this embodiment, if it is not possible to avoid entrance of the operational point into the surge region with a normal feedback control, such a control is performed that avoids entrance of the operational point into the surge region, and thus it is possible to avoid entrance of the supercharger into the surging state during transient operation.

Further, if the arrival time the operational point takes to arrive at the surge region from the current position is longer than the first predetermined time, for instance, if it is possible to avoid entrance of the operational point into the surge region with a normal feedback control, the above described control for avoiding entrance of the supercharger into the surging state is not performed. Thus, the operational range of the compressor in a normal control state is not unnecessarily narrowed.

(7) In some embodiments, in the control apparatus of a supercharging system described in (6), the controller further includes a control map storage part configured to store a control map for calculating a control amount of the control device corresponding to the current position of the operational point. The control part is configured to correct the control amount of the control device calculated on the basis of the control map so as to avoid entrance of the operational point into the surge region.

According to the above embodiment (7), the control device is controlled so as to avoid entrance of the operational point into the surge region, by correcting the control amount of the control devices calculated on the basis of the control map. The control map is, for instance, a map for calculating the control amount of the control device during normal operation of the engine. Accordingly, it is possible to control the compressor so as to avoid entrance of the supercharger into the surging state, with a simple configuration of correcting the control amount calculated by the control map.

(8) In some embodiments, in the control apparatus of a supercharging system described in (5), the control part is configured to control the control device so that the operational point arrives at the target position in a shorter time than a second predetermined time, if the arrival time the operational point takes to arrive at the target position from the current position is longer than the second predetermined time.

According to this embodiment (8), the compressor is controlled so that the operational point arrives at the target position in a shorter time than the second predetermined time if the arrival time the operational point takes to arrive at the target position from the current position is longer than the second predetermined time. This target position is a position where the compressor efficiency is higher than a predetermined efficiency on the compressor map (for instance, a position where the compressor efficiency is not less than 75%). Thus, according to this embodiment, if the operational point takes too long to arrive at the target position under a normal control, such a control is performed that causes the operational point to arrive at the target position earlier, and thereby it is possible to make the operational point of the compressor arrive at the target position earlier than in the normal control.

(9) In some embodiments, in the control apparatus of a supercharging system described in (8), the controller further includes a control map storage part configured to store a control map for calculating a control amount of the control device corresponding to the current position of the operational point. The control part is configured to correct the control amount of the control device calculated on the basis of the control map so that the operational point arrives at the target position in a shorter time than the second predetermined time.

According to the above embodiment (9), the control device is controlled so that the operational point arrives at the target position in a shorter time than the second predetermined time, by correcting the control amount of the control device calculated on the basis of the control map. The control map is, for instance, a map for calculating the control amount of the control device during normal operation of the engine. Accordingly, it is possible to control the compressor so that the operation point arrives at the target position in a shorter time than the second predetermined time, with a simple configuration of correcting the control amount calculated by the control map.

(10) In some embodiments, in the control apparatus of a supercharging system according to any one of (1) to (9), the supercharger comprises a turbocharger configured to rotate the compressor with a turbine rotated by exhaust gas discharged from the engine. The control device includes at least one of a fuel injection device for supplying the engine with fuel, a variable nozzle mechanism for controlling a flow direction of the exhaust gas flowing into the turbine, or a waste gate valve for controlling a flow rate of the exhaust gas flowing into the turbine.

According to the above embodiment (10), it is possible to provide a control apparatus of a supercharging system provided with a supercharger comprising a turbocharger.

Advantageous Effects

According to at least one embodiment of the present invention, it is possible to provide a control apparatus for a supercharging system capable of moving the operational point of the supercharger to a desired position on a compressor map accurately. By moving the operational point of the supercharger accurately to a desired position on a compressor map, it is possible to maximize the performance of the supercharger.

DETAILED DESCRIPTION

Figure 1:
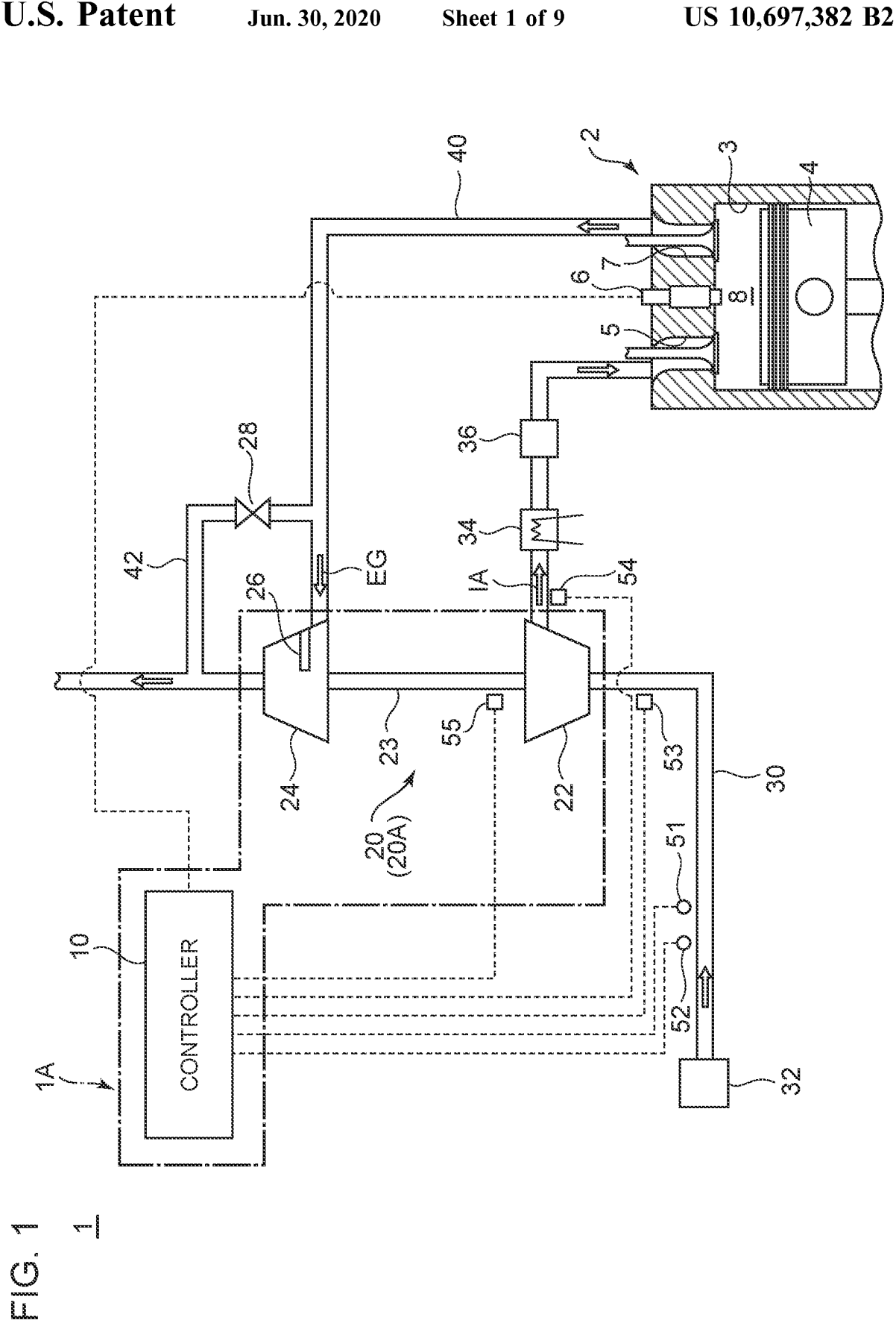
FIG. 1 is an overall configuration diagram of a supercharging system to which a control apparatus of a supercharging system according to an embodiment of the present invention is to be applied.

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Further, in the description below, some the same features are associated with the same reference numerals and not described again.

First Embodiment

FIG. 1 is an overall configuration diagram of a supercharging system to which a control apparatus of a supercharging system according to an embodiment of the present invention is to be applied. A control apparatus 1A of a supercharging system according to an embodiment of the present invention is a control apparatus 1A of a supercharging system for supplying an engine 2 with compressed intake air IA, and as shown in FIG. 1, the control apparatus 1A includes a supercharger 20 including a compressor 22 to compress intake air IA to be supplied to the engine 2 and a controller 10 for controlling control devices that affect operation of the compressor 22.

In the depicted embodiment, the supercharger 20 includes a turbocharger 20A to rotate the compressor 22 with a turbine 24 which is rotated by exhaust gas EG discharged from the engine 2.

In the supercharging system 1 depicted in FIG. 1, air (intake air) introduced into an intake duct 30 via an air cleaner 32 flows into the compressor 22 of the turbocharger 20A. The turbocharger 20A includes the compressor 22 disposed in the intake duct 30, a turbine 24 disposed in an exhaust duct 40, and a rotor 23 coupling the compressor 22 and the turbine 24. The turbine 24 is rotary-driven by exhaust energy of exhaust gas EG discharged from the engine 2, and the compressor 22 is coaxially driven, thereby compressing the intake air IA having flowed into the compressor 22.

The intake air IA compressed by the compressor 22 is cooled by an inter cooler 34, having the intake flow rate adjusted by a throttle valve 36, and is supplied to a combustion chamber 8 via an intake port 5. The combustion chamber 8 is a space defined between a cylinder liner 3 and a piston 4. Further, the engine 2 includes a fuel injection device 6 for injecting a fuel into the combustion chamber 8. Further, the fuel supplied to the combustion chamber 8 from the fuel injection device 6 is self-ignited (or ignited by a non-depicted ignition device) by compression heat, and thereby is combusted and expanded in the combustion chamber 8. Exhaust gas EG generated in the combustion chamber 8 is discharged to the exhaust duct 40 via an exhaust port 7.

The exhaust gas exhausted to the exhaust duct 40 flows into the turbine 24 of the above described turbocharger 20A to rotary-drive the turbine 24. Further, a bypass channel 42 bypassing the turbine 24 is connected to the exhaust duct 40. A waste-gate valve 28 is disposed in the bypass channel 42, for controlling the flow rate of exhaust gas EG flowing through the bypass channel 42.

Furthermore, the turbine 24 is provided with a variable nozzle mechanism 26 for controlling the flow of the exhaust gas EG which acts on the turbine 24.

The above described devices including the fuel injection device 6, the variable nozzle mechanism 26, and the waste-gate valve 28 correspond to the above described control devices that affect operation of the compressor 22.

Furthermore, in the supercharging system 1 depicted in FIG. 1, an air flow meter 51 for measuring the flow rate of the intake air IA flowing through the intake duct 30 and an intake temperature sensor 52 for measuring the temperature of intake air flowing through the intake duct 30 are provided on the upstream side of the compressor 22 in the intake duct 30. Furthermore, an inlet pressure sensor 53 for measuring the pressure of intake air IA flowing into the compressor 22 is disposed at an inlet of the compressor 22 in the intake duct 30. Furthermore, an outlet pressure sensor 54 for measuring the pressure of intake air IA compressed by the compressor 22 is disposed at an outlet of the compressor 22 in the intake duct 30. Furthermore, the turbocharger 20 is provided with a turbo rotation speed sensor 55 for measuring the turbo rotation speed (i.e. the rotation speed of the compressor 22). Each information measured by the air flow meter 51, the intake temperature sensor 52, the inlet pressure sensor 53, the outlet pressure sensor 54, and the turbo rotation speed sensor 55 is transmitted to the controller 10.

The controller 10 comprises a microcomputer separate from one another, the microcomputer including a central processing unit (CPU), a random access memory (RAM), a read only memory (ROM), and an I/O interface.

Figure 2:
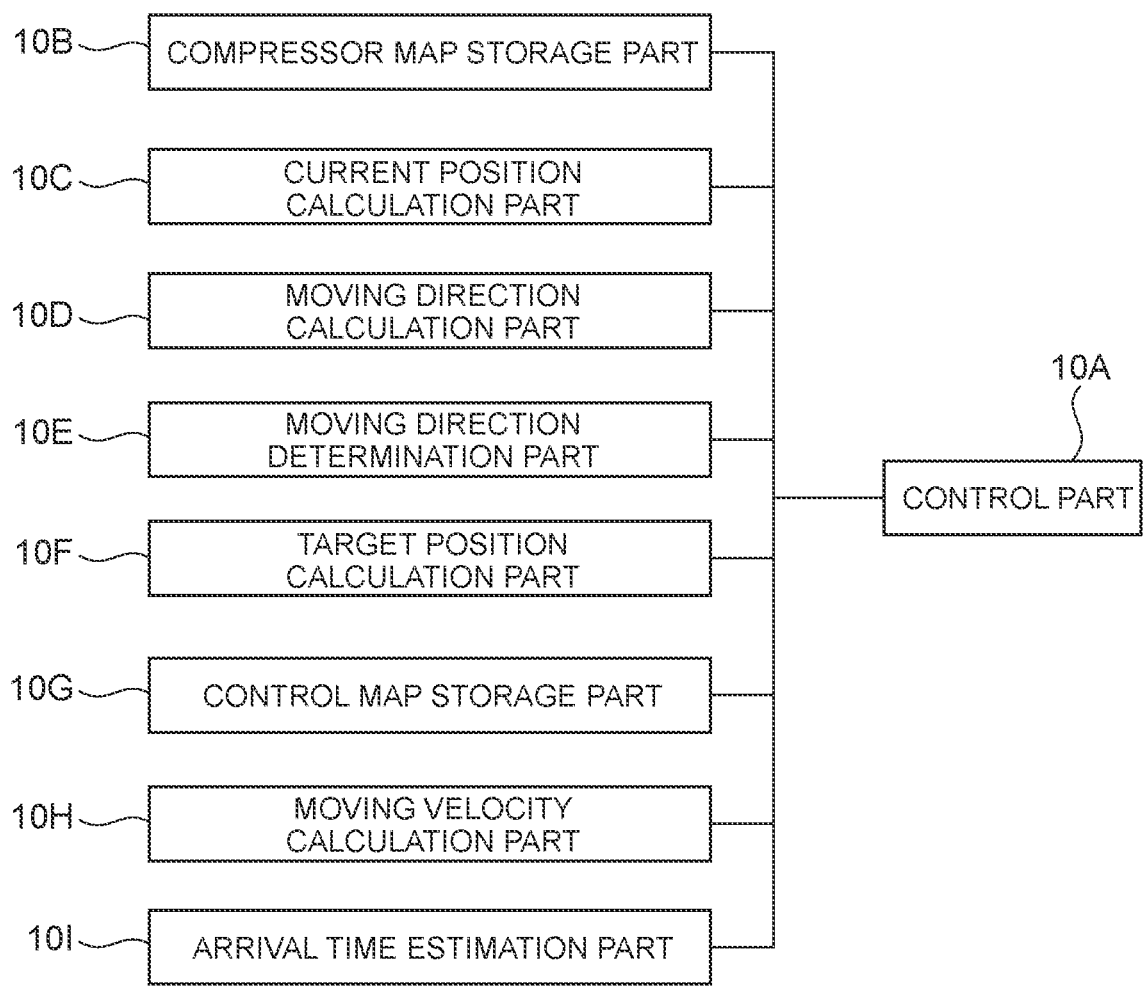
FIG. 2 is a block diagram for describing the function of a controller.

FIG. 2 is a block diagram for describing the function of a controller. As shown in FIG. 2, the controller 10 includes a control part 10A, a compressor map storage part 10B, a current position calculation part 10C, and a moving direction calculation part 10D.

The compressor map storage part 10B is a part of the controller 10, which functions as a memory that stores the compressor map M1 described below.

Figure 3:
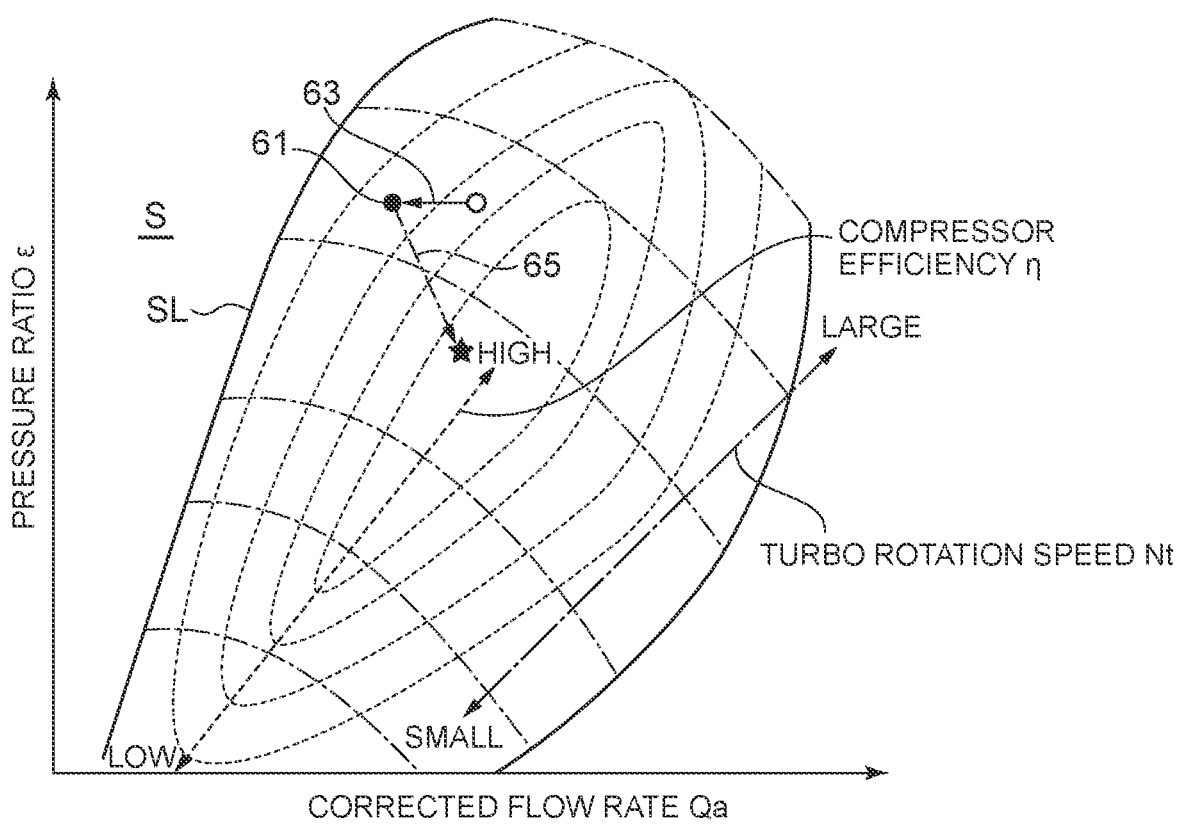
FIG. 3 is a diagram of a compressor map.

FIG. 3 is a diagram of a compressor map. As shown in FIG. 3, on the compressor map M1, the horizontal axis represents the corrected flow rate Qa and the vertical axis represents the pressure ratio ε. The corrected flow rate Qa is obtained by converting the intake flow rate detected by the air flow meter 51 into an intake volume flow rate at a reference temperature. The pressure ε is obtained by dividing the compressor outlet pressure P2 detected by the outlet pressure sensor 54 by the compressor inlet pressure P1 detected by the inlet pressure sensor 53 (ε=P2/P1), for instance. Furthermore, on the compressor map M1 shown in FIG. 3, the compressor efficiency η is represented by the dotted line, and the turbo rotation speed Nt is represented by the chain line. The turbo rotation speed Nt can be determined from the turbo rotation speed detected by the turbo rotation speed sensor 55, for instance.

Furthermore, on the compressor map M1 shown in FIG. 3, if at least two of the corrected flow rate Qa, the pressure ratio ε, and the turbo rotation speed Nt are known, it is possible to determine the position of the operational point 61 on the compressor map M1. It should be noted that a method for obtaining the corrected flow rate Qa, the pressure ratio ε, and the turbo rotation speed Nt is not limited to the above described method. Besides the above described method, other known methods can be used to obtain the corrected flow rate Qa, the pressure ratio ε, and the turbo rotation speed Nt.

The current position calculation part 10C is a part of the controller 10, which has a function to calculate the current position of the operational point 61 of the compressor 22 on the compressor map M1 every predetermined period.

The operational point 61 keeps moving on the compressor map M1 in response to a change in the operational state of the engine 2, for instance. The current position calculation part 10C calculates, at intervals of a predetermined period, the current position of the operational point 61 that moves continuously on the compressor map M1, and stores the current position in a memory or the like.

The moving direction calculation part 10D is a part of the controller 10, which has a function to calculate the moving direction (indicated by "arrow 63" in FIG. 3) of the operational point 61 on the compressor map M1, on the basis of the current position of the operational point 61 calculated by the current position calculation part 10C.

The current moving direction of the operational point 61 can be obtained from a previous position (marked with a hollow circle in FIG. 3) of the operational point 61 calculated by the current position calculation part 10C a predetermined period ago, and the current position (marked with a solid circle in FIG. 3) of the operational point 61 calculated by the current position calculation part 10C.

The control part 10A is a part of the controller 10, which has a function to control the control devices 6, 26, 28, on the basis of the current position of the operational point 61 calculated by the current position calculation part 10C and the moving direction of the operational point 61 calculated by the moving direction calculation part 10D.

With the control device 1A of the supercharging system according to the present embodiment having the above configuration, operation of the compressor 22 is controlled on the basis of both of the current position of the operational point 61 and the moving direction of the operational point 61 on the compressor map M1. Thus, compared to a typical case in which operation of the compressor is controlled on the basis of only the current position of the operational point 61 on the compressor map M1, it is possible to use the moving direction of the operational point 61 to control the compressor 22, and thereby it is to move the operational point 61 of the compressor 22 to a desired position on the compressor map M1 efficiently. Accordingly, it is possible to maximize the performance of the turbocharger 20A.

In some embodiments, as shown in FIG. 2, the controller 10 further includes a moving direction determination part 10E. The moving direction determination part 10E is a part of the controller 10, which determines whether the moving direction of the operational point 61 is in a target direction. A target direction is a direction (represented by "arrow 65" in FIG. 3) from the current position of the operational point 61 to a target position (marked with a star in FIG. 3) on the compressor map M1. A target position of the operational point 61 is set by a target position calculation part 10F of the controller 10 as needed, in accordance with the operational state of the engine 2, for instance.

Furthermore, as described below with reference to FIGS. 4 and 5, the control part 10A is configured to control the control devices 6, 26, 28 so as to orient the moving direction of the operational point 61 in the target direction, if the moving direction of the operational point 61 is not in the target direction.

According to this embodiment, the control devices 6, 26, 28 are controlled automatically by the control part 10A so that the moving direction of the operational point 61 turns in the target direction. Thus, it is possible to move the operational point 61 of the compressor 22 efficiently to a position (e.g. target position) on the compressor map M1.

In some embodiments, as shown in FIG. 2, the controller 10 further includes a control map storage part 10G. The control map storage part 10G is a part of the controller 10, which has a function to store a control map for calculating the control amount of the control devices 6, 26, 28 or the like corresponding to the current position of the operational point 61. The control map is, for instance, a map (normal control map) for calculating the control amount of the control devices 6, 26, 28 and the like during normal operation of the engine 2.

Furthermore, as described below with reference to FIGS. 4 and 5, the control part 10A is configured to correct the control amount of the control devices 6, 26, 28 or the like calculated on the basis of the control map so as to orient the moving direction of the operational point 61 in the target direction.

According to this embodiment, the control devices 6, 26, 28 are controlled so that the moving direction of the operational point 61 turns in the target direction, by correcting the control amount of the control devices 6, 26, 28 calculated on the basis of the control map. Accordingly, it is possible to control the compressor 22 so that the moving direction of the operational point 61 turns in the target direction, with a simple configuration of correcting the control amount calculated by the control map.

Figure 4:
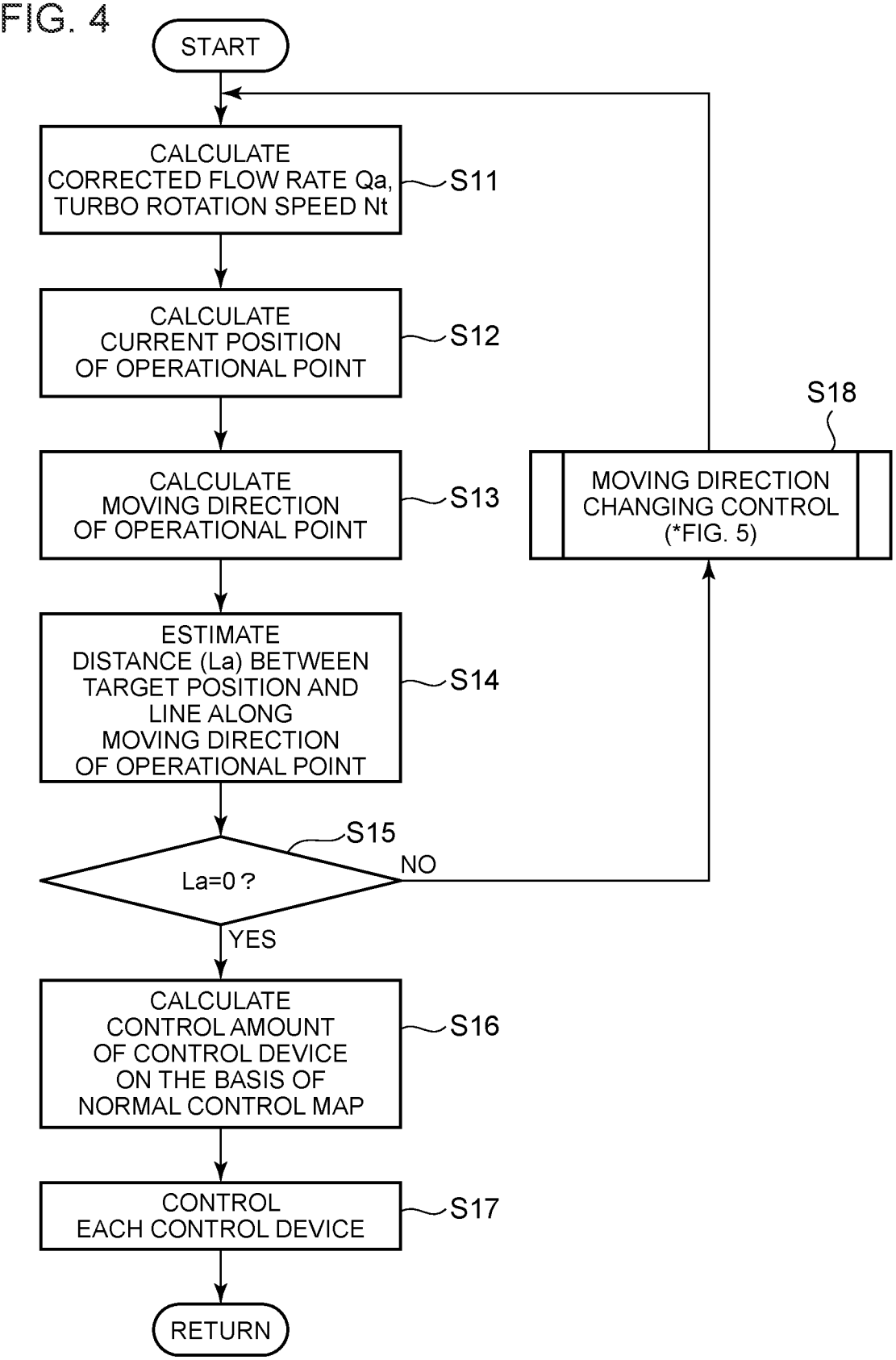
FIG. 4 is a diagram of an example of a control flow according to an embodiment of the present invention.

FIG. 4 is a diagram of an example of a control flow according to an embodiment of the present invention. FIG. 5 is a diagram showing a control flow for changing the moving direction of an operational point.

In the control flow shown in FIG. 4, the corrected flow rate Qa and the turbo rotation speed Nt are calculated (S11).

Next, on the basis of the corrected flow rate Qa and the turbo rotation speed Nt calculated in S11, the above described current position calculation part 10C calculates the current position of the operational point 61 on the compressor map M1 (S12). Next, on the basis of the current position of the operational point 61 calculated by the current position calculation part 10C, the above described moving direction calculation part 10D calculates the moving direction of the operational point 61 on the compressor map M1 (S13).

Next, the moving direction determination part 10E determines whether the moving direction of the operational point 61 is in the target direction (S14, S15). In S14, the distance La between the line 63L along the moving direction of the operational point 61 and the target position (length of a perpendicular to the line 63L at the target position) is calculated (see FIG. 6). Next, in S15, it is determined whether the calculated distance La is zero. If the calculated distance satisfies La=0 (YES in S15), it is determined that the moving direction of the operational point 61 is in the target direction, and the process advances to S16. If the calculated distance satisfies L≠ (NO in S15), the process advances to S18, and the moving direction changing control flow shown in FIG. 5 is performed.

Figure 5:
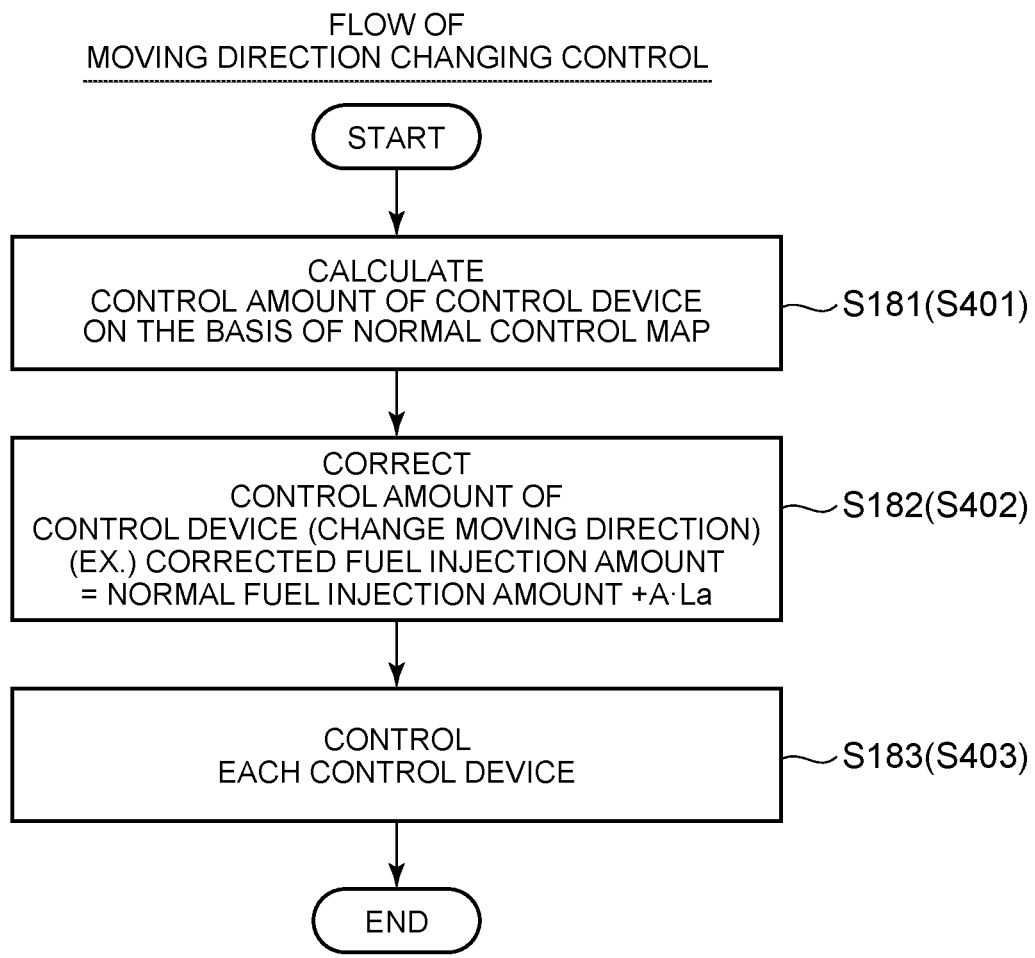
FIG. 5 is a diagram showing a control flow for changing the moving direction of an operational point.
Figure 6:
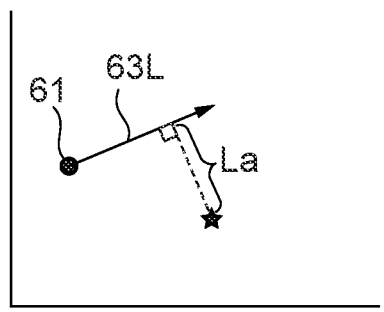
FIG. 6 is a diagram for describing the distance La.

In the moving direction changing control flow shown in FIG. 5, firstly in S181, the control amount of the control devices 6, 26, 28 and the like is calculated on the basis of the normal control map. Next, in S182, the control amount of the control devices 6, 26, 28 and the like calculated in S181 is corrected. For instance, if the control device is the fuel injection device 6 and the control amount is the fuel injection amount injected from the fuel injection device 6, a value A·La, which is the product of coefficient A and distance La, is added to the fuel injection amount (normal fuel injection amount) calculated by the normal control map. As described above, by changing the correction amount on the basis of the distance La, it is possible to increase the correction amount when the moving direction is considerably different from the target direction and to orient the moving direction in the target direction quickly. Then, the control part 10A controls the fuel injection device 6 so as to inject the calculated fuel injection amount after correction (corrected fuel injection amount) (S183).

Such a moving direction changing control is repeated until the moving direction of the operational point 61 is determined to be in the target direction in S15. While the moving direction of the operational point 61 is determined to be in the target direction when La=0 is satisfied in the above description, the moving direction of the operational point 61 may be determined to be in the target direction when La≤th is satisfied (th is a threshold and is not less than zero).

Referring again to the control flow in FIG. 4, if it is determined that the moving direction of the operational point 61 is in the target direction, the control amount of the control devices 6, 26, 28 is calculated on the basis of the normal control map in S16, and the control devices 6, 26, 28 are controlled by the control part 10A in S17 on the basis of the control amount calculated in S16. That is, a normal operation control is performed.

Thus, by controlling operation of the compressor 22 on the basis of both of the current position of the operational point 61 and the moving direction of the operational point 61 on the compressor map M1, it is possible to move the operational point 61 of the compressor 22 to a desired position on the compressor map M1 efficiently, as compared to a typical case in which operation of the compressor is controlled on the basis of only the current position of the operational point 61 on the compressor map M1.

Second Embodiment

In some embodiments, as shown in FIG. 2, the controller 10 further includes a moving velocity calculation part 10H. The moving velocity calculation part 10H is a part of the controller 10, which has a function to calculate the moving velocity of the operational point 61, on the basis of the change amount per time of the current position of the operational point 61 calculated by the current position calculation part 10C.

As described below with reference to FIGS. 7 and 8, the control part 10A is configured to control the control devices 6, 26, 28 and the like on the basis of the current position of the operational point 61 calculated by the current position calculation part 10C, the moving direction of the operational point 61 calculated by the moving direction calculation part 10D, and the moving velocity of the operational point 61 calculated by the moving velocity calculation part 10H.

With this embodiment, the compressor 22 is controlled on the basis of the moving velocity of the operational point 61 on the compressor map M1, in addition to the current position of the operational point 61 and the moving direction of the operational point 61 on the compressor map M1. Accordingly, by using the moving velocity of the operational point 61 to control the compressor 22, it is possible to reflect the concept of time in the control when moving the operational point 61 of the compressor 22 to a desired position on the compressor map M1.

In some embodiments, as shown in FIG. 2, the controller 10 further includes an arrival time estimation part 10I. The arrival time estimation part 10I is a part of the controller 10, which has a function to estimate an arrival time to the operational point 61 takes to arrive at a predetermined region or a target position from the current position, on the basis of the moving direction and the moving velocity of the operational point 61. Herein, a predetermined region refers to a region determined in advance that occupies a predetermined range on the compressor map M1. For instance, in the following embodiment, the predetermined region is the surge region S defined as a region where surging is likely to occur when the operational point 61 is positioned in the predetermined region (see FIG. 3).

As described below with reference to FIGS. 7 and 8, the control part 10A is configured to estimate the arrival time the operational point 61 takes to arrive at a predetermined region or a target position from the current portion on the basis of the moving direction and the moving velocity of the operational point 61, and to control the control devices 6, 26, 28 and the like in response to the comparison result between the arrival time ta and the predetermined time.

Figure 9:
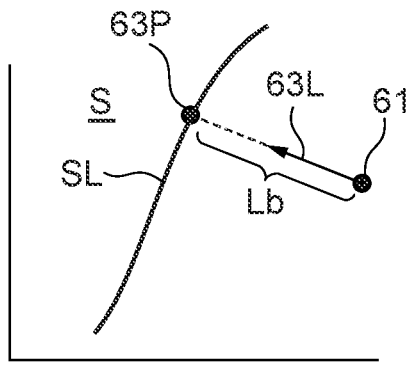
FIG. 9 is a diagram for describing how to estimate the arrival time.

FIG. 9 is a diagram for describing how to estimate the arrival time. The arrival time ta is estimated by calculating the distance Lb between the current position of the operational point 61 and the intersection 63P of the surge line SL and the line 63L along the moving direction of the operational point 61, and dividing the distance Lb by the current moving velocity Va $(=\sqrt{\{(dQa/dt)^2+(d\varepsilon/dt)^2\}})$ of the operational point 61 (ta=Lb/Va).

According to this embodiment, the arrival time ta the operational point 61 takes to arrive at a predetermined region or a target position from the current portion 61 is estimated on the basis of the moving direction and the moving velocity of the operational point 61, and the control devices 6, 26, 28 and the like are controlled in response to the comparison result between the estimated arrival time and the predetermined time. Thus, for instance, as described below, it is possible to control the compressor 22 taking into account the time the operational point 61 takes to enter the surge region from the current position and the time the operational point 61 takes to arrive at a target position from the current position.

In some embodiments, the above described predetermined region is the surge region S. Further, the control part 10A is configured to control the control devices 6, 26, 28 and the like so as to avoid entrance of the operational point 61 into the surge region S if the arrival time ta the operational point 61 takes to arrive at the surge region S from the current position is shorter than the first predetermined time tc.

According to this embodiment, the compressor 22 is controlled so as to avoid entrance of the operational point 61 into the surge region S if the arrival time ta the operational point 61 takes to arrive at the surge region S over the surge line SL from the current position is shorter than the first predetermined time. The first predetermined time is a time necessary for the operational point 61 at the current position to avoid entering the surge region S (response delay time) when a normal feedback control is performed on the control devices 6, 26, 28 and the like. Thus, according to this embodiment, if it is not possible to avoid entrance of the operational point 61 into the surge region S with a normal feedback control, such a control is performed that avoids entrance of the operational point 61 into the surge region S, and thus it is possible to avoid entrance of the turbocharger 20 into the surging state during transient operation.

Further, if the arrival time ta the operational point 61 takes to arrive at the surge region S from the current position is longer than the first predetermined time tc, for instance, if it is possible to avoid entrance of the operational point 61 into the surge region S with a normal feedback control, the above described control for avoiding entrance of the operational point 61 into the surge region S is not performed. Thus, the operational range of the compressor 22 in a normal control state is not unnecessarily narrowed.

Figure 7:
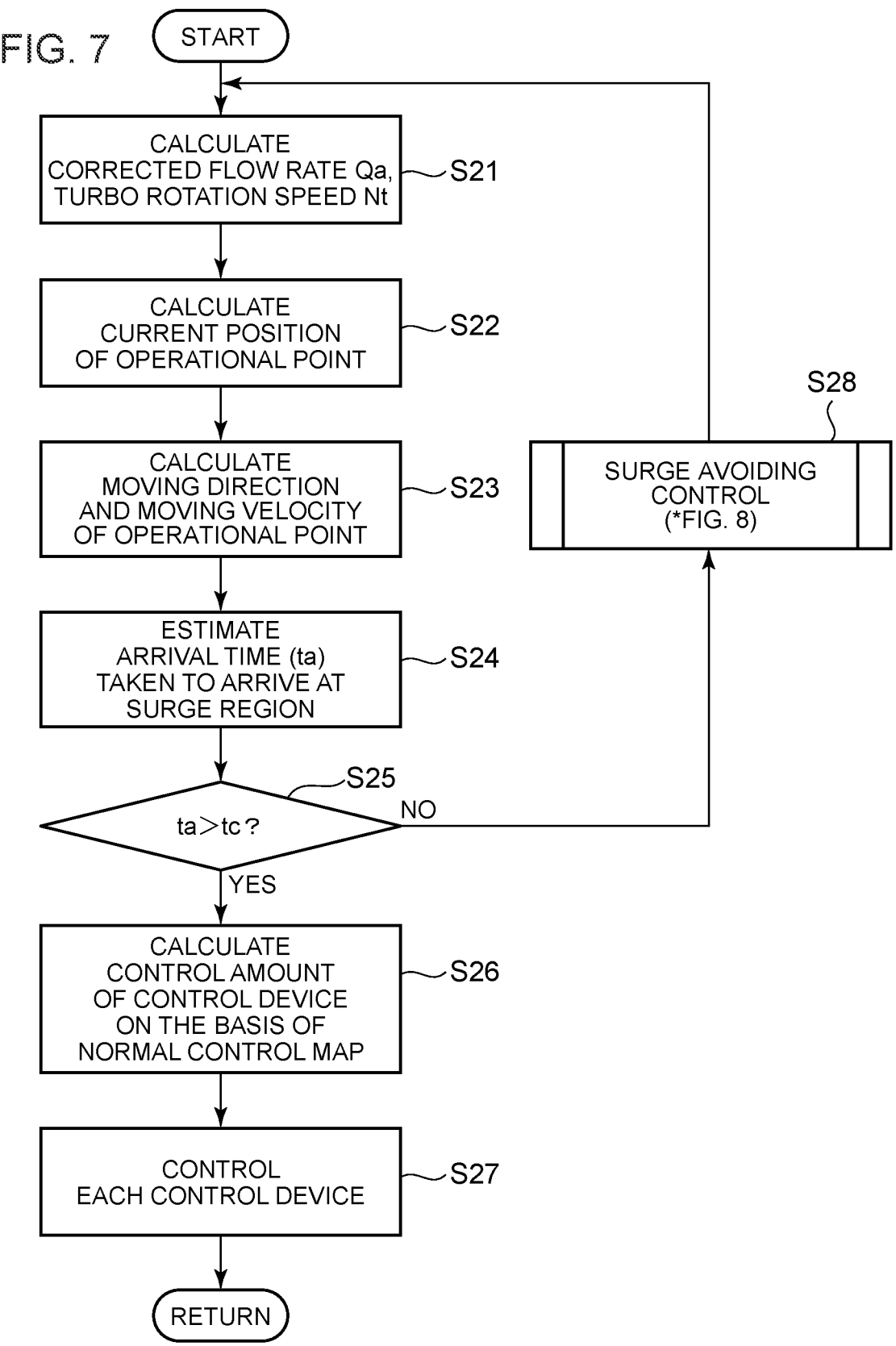
FIG. 7 is a diagram of an example of a control flow according to an embodiment of the present invention.

FIG. 7 is a diagram of an example of a control flow according to an embodiment of the present invention. FIG. 8 is a diagram showing a control flow for avoiding entrance of the operational point into the surge region.

In the control flow shown in FIG. 7, the corrected flow rate Qa and the turbo rotation speed Nt are calculated (S21). Next, on the basis of the corrected flow rate Qa and the turbo rotation speed Nt calculated in S21, the above described current position calculation part 10C calculates the current position of the operational point 61 on the compressor map M1 (S22). Next, on the basis of the current position of the operational point 61 calculated by the current position calculation part 10C, the moving direction calculation part 10D and the moving velocity calculation part (10H) described above calculate the moving direction and the moving velocity of the operational point 61 on the compressor map M1 (S23).

Next, the arrival time estimation part 10I estimates the arrival time ta the operational point 61 takes to arrive at the surge region S, which is a predetermined region (S24), and the estimated arrival time ta and the first predetermined time tc are compared (S25). If ta>tc is satisfied (YES in S25), it is determined that entrance of the operational point 61 into the surge region S can be avoided with a normal feedback control, and the process advances to S26. If ta≤tc is satisfied (NO in S25), the process advances to S28, and the surge avoiding control flow shown in FIG. 8 is performed.

Figure 8:
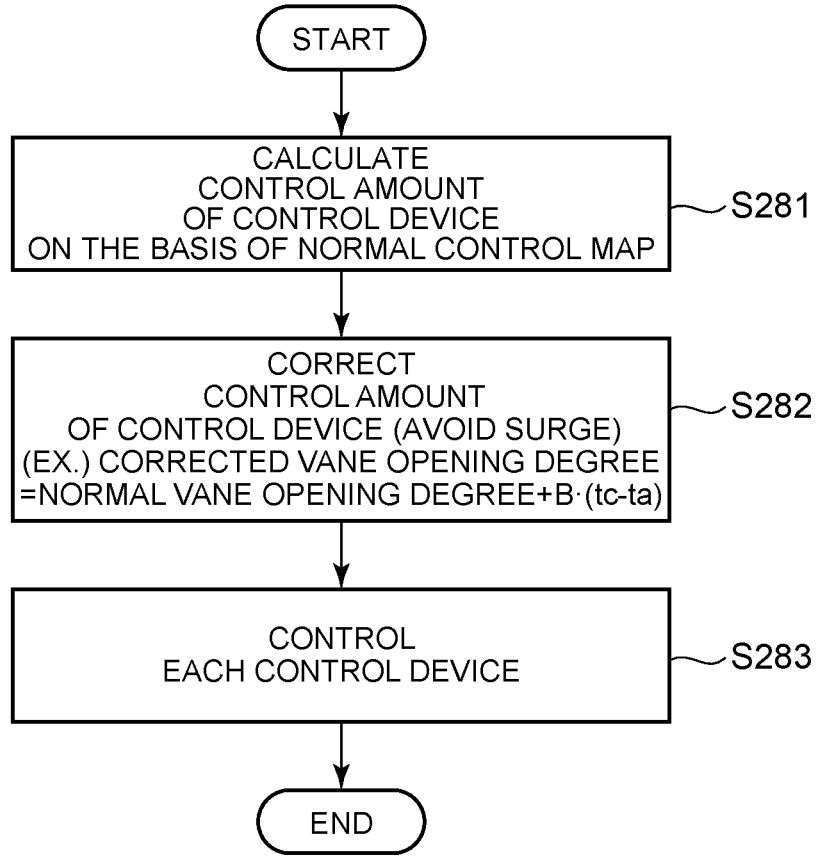
FIG. 8 is a diagram showing a control flow for avoiding entrance of the operational point into the surge region.

In the surge avoiding control flow shown in FIG. 8, firstly in S281, the control amount of the control devices 6, 26, 28 and the like is calculated on the basis of the normal control map. Next, in S282, the control amount of the control devices 6, 26, 28 and the like calculated in S281 is corrected. For instance, if the control device is the variable nozzle mechanism 26 and the opening degree of the nozzle vane of the variable nozzle mechanism 26 is the control amount, a value B·(tc−ta), which is a product of coefficient B and difference (tc−ta) between the first predetermined time tc and the estimated arrival time ta, is added to the opening degree (normal vane opening degree) of the nozzle vane calculated by the normal control map. As described above, the correction amount is changed in response to the difference (tc−ta) between the first predetermined time tc and the estimated arrival time ta, and thereby it is possible to increase the correction amount at the time when there is no room in the time before arriving at the surge region S, thereby avoiding entrance of the operational point 61 into the surge region S reliably. Further, the control part 10A controls the variable nozzle mechanism 26 so that the opening degree of the nozzle vane of the variable nozzle mechanism 26 becomes the opening degree of the nozzle vane after correction (corrected vane opening degree) (S283).

In S25, the surge avoiding control flow is performed repeatedly until it is determined that the arrival time ta the operational point 61 takes to arrive at the surge region S from the current position is longer than the first predetermined time tc.

Referring again to the control flow in FIG. 7, if it is determined that the arrival time ta the operational point 61 takes to arrive at the surge region S from the current position is longer than the first predetermined time tc, the control amount of the control devices 6, 26, 28 is calculated on the basis of the normal control map in S26, and the control devices 6, 26, 28 are controlled by the control part 10A in S27 on the basis of the control amount calculated in S26. That is, a normal operation control is performed.

Accordingly, the compressor 22 is controlled on the basis of the moving velocity of the operational point 61 on the compressor map M1, in addition to the current position of the operational point 61 and the moving direction of the operational point 61 on the compressor map M1, and thereby it is possible to avoid entrance of the turbocharger 20 into the surging state even in case where a normal feedback control cannot avoid entrance of the operational point 61 into the surge region S, as described above.

Third Embodiment

In some embodiments, as described below with reference to FIGS. 10 and 11, the control part 10A is configured to control the control devices 6, 26, 28 or the like so that the operational point 61 arrives at the target position in a shorter time than the second predetermined time td if the arrival time tb the operational point 61 takes to arrive at the target position from the current position is longer than the second predetermined time td.

According to this embodiment, the compressor 22 is controlled so that the operational point 61 arrives at the target position in a shorter time than the second predetermined time td if the arrival time the operational point 61 takes to arrive at the target position from the current position is longer than the second predetermined time td. This target position is a position where the compressor efficiency η is higher than a predetermined efficiency on the compressor map M1 (for instance, a position where the compressor efficiency is not less than 75%). Thus, according to this embodiment, if the operational point 61 takes too long to arrive at the target position under a normal control, such a control is performed that causes the operational point 61 to arrive at the target position earlier, and thereby it is possible to make the operational point 61 of the compressor 22 arrive at the target position earlier than in the normal control.

Figure 10:
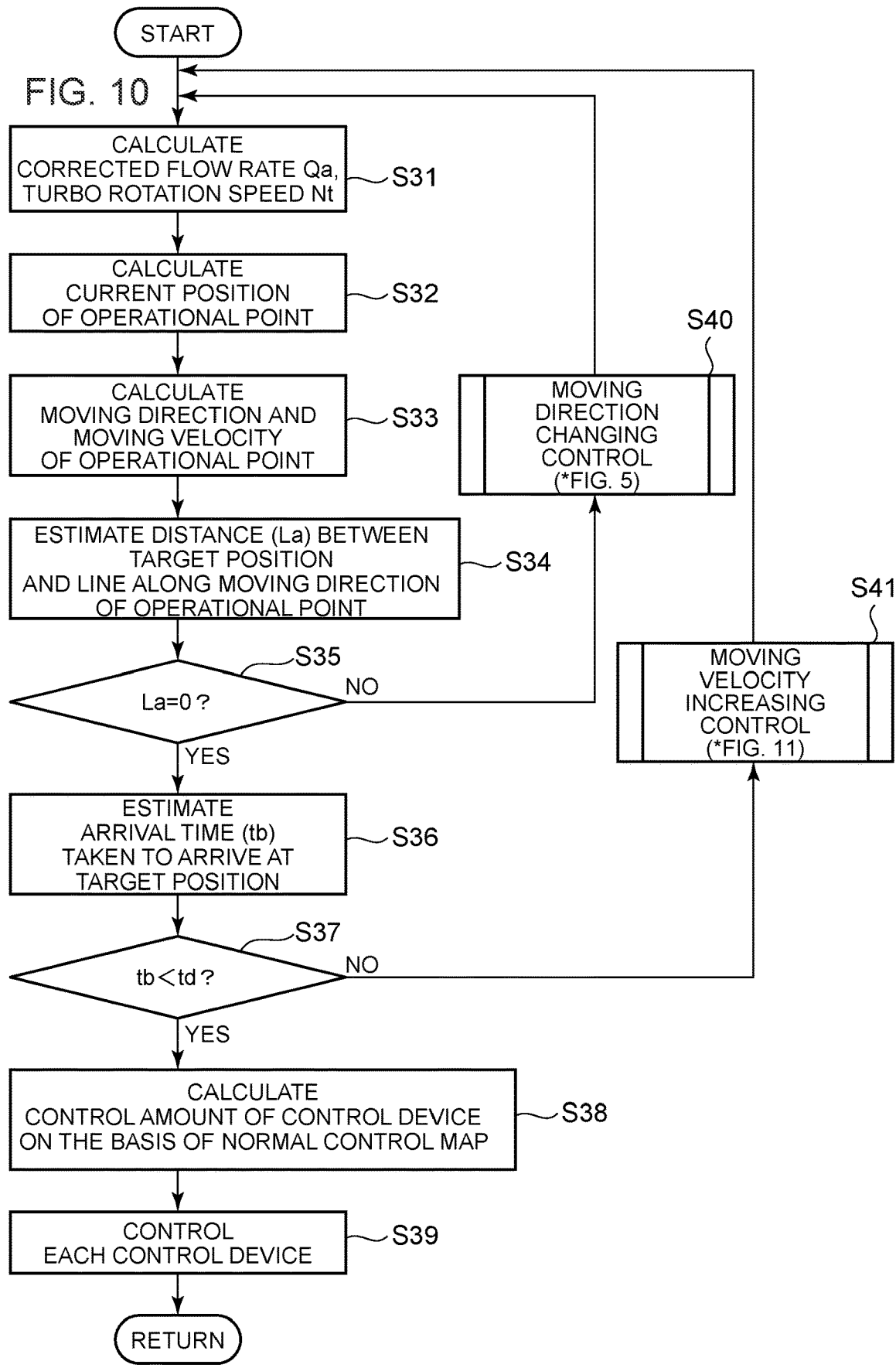
FIG. 10 is a diagram of an example of a control flow according to an embodiment of the present invention.

FIG. 10 is a diagram of an example of a control flow according to an embodiment of the present invention. FIG. 11 is a diagram showing a control flow for making the operational point arrive at a target position in an early stage.

In the control flow shown in FIG. 10, the corrected flow rate Qa and the turbo rotation speed Nt are calculated (S31). Next, on the basis of the corrected flow rate Qa and the turbo rotation speed Nt calculated in S31, the above described current position calculation part 10C calculates the current position of the operational point 61 on the compressor map M1 (S32). Next, on the basis of the current position of the operational point 61 calculated by the current position calculation part 10C, the moving direction calculation part 10D and the moving velocity calculation part (10H) described above calculate the moving direction and the moving velocity of the operational point 61 on the compressor map M1 (S33).

Next, the moving direction determination part 10E determines whether the moving direction of the operational point 61 is in the target direction (S34, S35). In S34, the distance La between the line 63L along the moving direction of the operational point 61 and the target position is calculated (see FIG. 6). Next, in S35, it is determined whether the calculated distance La is zero. If the calculated distance satisfies La=0 (YES in S35), it is determined that the moving direction of the operational point 61 is in the target direction, and the process advances to S16. If the calculated distance satisfies La≠ (NO in S35), the process advances to S40, and the moving direction changing control flow shown in FIG. 5 is performed (S401 to S403). S401 to S403 are the same as S181 to S183 in the above described embodiment, and thus not described here in detail.

Next, the arrival time estimation part 10I estimates the arrival time tb the operational point 61 takes to arrive at target position (S36), and the estimated arrival time tb and the second predetermined time td are compared (S37). If tb<td is satisfied (YES in S25), the process advances to S26. If tb≥td is satisfied (NO in S37), the process advances to S41, and the moving velocity increasing control flow shown in FIG. 11 is performed, so as to make the operational point 61 arrive at the target position earlier.

Figure 11:
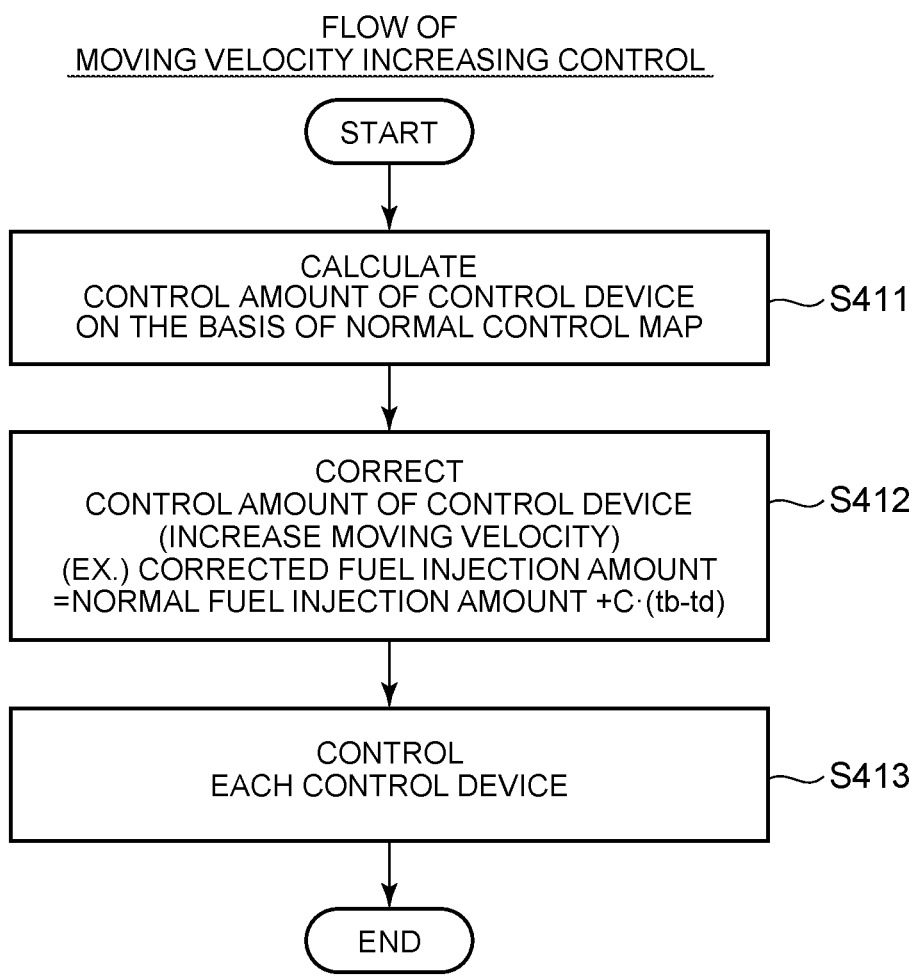
FIG. 11 is a diagram showing a control flow for making the operational point arrive at a target position in an early stage.

In the moving velocity increasing control flow shown in FIG. 11, firstly in S411, the control amount of the control devices 6, 26, 28 and the like is calculated on the basis of the normal control map. Next, in S412, the control amount of the control devices 6, 26, 28 and the like calculated in S411 is corrected. For instance, if the control device is the waste-gate valve 28 and the valve opening degree of the waste-gate valve 28 is the control amount, a value C·(tb−td), which is a product of coefficient C and difference (tb−td) between the estimated arrival time tb and the second predetermined time td, is added to the valve opening degree (normal valve opening degree) of the waste-gate valve 28 calculated by the normal control map. As described above, the correction amount is changed in response to the difference (tb−td) between the estimated arrival time tb and the second predetermined time tc, and thereby it is possible to increase the correction amount in a case where the arrival time the operational point 61 takes to arrive at the target position is long, and to move the operational point 61 to the target position in an early stage. Further, the control part 10A controls the waste-gate valve 28 so that the valve opening degree of the waste-gate valve 28 becomes the valve opening degree of the waste-gate valve 28 after correction (corrected valve opening degree) (S413).

In S37, the moving velocity increasing control flow is performed repeatedly until it is determined that the arrival time tb the operational point 61 takes to arrive at the target position is below the second predetermined time tc.

Referring again to the control flow in FIG. 10, if it is determined that the arrival time tb the operational point 61 takes to arrive at the target position is below the second predetermined time tc, the control amount of the control devices 6, 26, 28 is calculated on the basis of the normal control map in S38, and the control devices 6, 26, 28 are controlled by the control part 10A in S39 on the basis of the control amount calculated in S38. That is, a normal operation control is performed.

Accordingly, the compressor 22 is controlled on the basis of the moving velocity of the operational point 61 on the compressor map M1, in addition to the current position of the operational point 61 and the moving direction of the operational point 61 on the compressor map M1, and thereby it is possible to make the operational point 61 arrive at the target position earlier than in a normal control in a case where the operational point 61 takes too long to arrive at the target position under a normal control, as described above.

The embodiments of the present invention have been described above. However, the present invention is not limited thereto, and various modifications may be applied as long as they do not depart from the object of the present invention.

DESCRIPTION OF REFERENCE NUMERALS

1 Supercharging system
1A Control apparatus of supercharging system
2 Engine
3 Cylinder liner
4 Piston
5 Intake port
6 Fuel injection device (control device)
7 Exhaust port
8 Combustion chamber
10 Controller
10A Control part
10B Compressor map storage part
10C Current position calculation part
10D Moving direction calculation part
10E Moving direction determination part
10F Target position calculation part
10G Control map storage part
10H Moving velocity calculation part
10I Arrival time estimation part
20 Supercharger
20A Turbocharger
22 Compressor
23 Rotor
24 Turbine
26 Variable nozzle mechanism (control device)
28 Waste-gate valve (control device)
32 Air cleaner
34 Inter cooler
36 Throttle valve
40 Exhaust duct
42 Bypass channel
51 Air flow meter
52 Intake temperature sensor
53 Inlet pressure sensor
54 Outlet pressure sensor
55 Turbo rotation speed sensor
61 Operational point
63L Line along moving direction of operational point
63P Intersection of surge line and line along moving direction of operational point

The invention claimed is:

1. A control apparatus of a supercharging system for supplying an engine with compressed intake air, the control apparatus comprising:
a supercharger including a compressor configured to compress the intake air to be supplied to the engine; and
a controller for controlling a control device affecting operation of the compressor,
wherein the controller includes:
a compressor map storage part configured to store a compressor map which indicates a relationship of an intake volume flow rate, a pressure ratio, and a compressor rotation speed in the compressor;
a current position calculation part configured to calculate a current position of an operational point of the compressor on the compressor map every predetermined period;
a moving direction calculation part configured to calculate a current moving direction of the operational point on the compressor map on the basis of a previous position and the current position of the operational point calculated by the current position calculation part; and
a control part configured to control the control device on the basis of the current position of the operational point calculated by the current position calculation part and the moving direction of the operational point calculated by the moving direction calculation part
wherein the controller further includes a moving velocity calculation part configured to calculate a moving velocity of the operational point on the basis of a change amount per time of the current position of the operational point calculated by the current position calculation part, and
wherein the control part is configured to control the control device on the basis of the current position of the operational point calculated by the current position calculation part, the moving direction of the operational point calculated by the moving direction calculation part, and the moving velocity of the operational point calculated by the moving velocity calculation part.

2. The control apparatus of a supercharging system according to claim 1,
wherein the controller further includes a moving direction determination part configured to determine whether the moving direction of the operational point is in a target direction, and
wherein the control part is configured to control the control device so as to orient the moving direction of the operational point in the target direction, if the moving direction of the operational point is not in the target direction.

3. The control apparatus of a supercharging system according to claim 2,
wherein the controller further includes a control map storage part configured to storage a control map for calculating a control amount of the control device corresponding to the current position of the operational point, and wherein the control part is configured to correct the control amount of the control device calculated on the basis of the control map, so as to orient the moving direction of the operational point in the target direction.

4. The control apparatus of a supercharging system according to claim 1,
wherein the controller further includes an arrival time estimation part configured to estimate an arrival time the operational point takes to arrive at a predetermined region or a target position from the current position, on the basis of the moving direction and the moving velocity of the operational point, and
wherein the control part is configured to control the control device in response to a comparison result between a predetermined time and the arrival time estimated by the arrival time estimation part.

5. The control apparatus of a supercharging system according to claim 4,
wherein the predetermined region is a surge region defined as a region where surging is likely to occur if the operational point is in the predetermined region, and
wherein the control part is configured to control the control device so as to avoid entrance of the operational point into the surge region, if the arrival time the operational point takes to arrive at the surge region from the current position is shorter than a first predetermined time.

6. The control apparatus of a supercharging system according to claim 5,
wherein the controller further includes a control map storage part configured to store a control map for calculating a control amount of the control device corresponding to the current position of the operational point, and
wherein the control part is configured to correct the control amount of the control device calculated on the basis of the control map so as to avoid entrance of the operational point into the surge region.

7. The control apparatus of a supercharging system according to claim 4,
wherein the control part is configured to control the control device so that the operational point arrives at the target position in a shorter time than a second predetermined time, if the arrival time the operational point takes to arrive at the target position from the current position is longer than the second predetermined time.

8. The control apparatus of a supercharging system according to claim 7,
wherein the controller further includes a control map storage part configured to store a control map for calculating a control amount of the control device corresponding to the current position of the operational point, and
wherein the control part is configured to correct the control amount of the control device calculated on the basis of the control map so that the operational point arrives at the target position in a shorter time than the second predetermined time.

9. The control apparatus of a supercharging system according to claim 1,
wherein the supercharger comprises a turbocharger configured to rotate the compressor with a turbine rotated by exhaust gas discharged from the engine, and
wherein the control device includes at least one of a fuel injection device for supplying the engine with fuel, a variable nozzle mechanism for controlling a flow direction of the exhaust gas flowing into the turbine, or a waste gate valve for controlling a flow rate of the exhaust gas flowing into the turbine.

* * * * *